United States Patent
Shyu et al.

(10) Patent No.: US 7,200,238 B1
(45) Date of Patent: Apr. 3, 2007

(54) ACOUSTIC SIGNAL LEVEL LIMITER

(75) Inventors: Ching Shyu, San Jose, CA (US); Robert Khamashta, Los Gatos, CA (US); Robert J. Bernardi, Scotts Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 895 days.

(21) Appl. No.: 09/967,677

(22) Filed: Sep. 28, 2001

(51) Int. Cl.
*H04B 15/00* (2006.01)

(52) U.S. Cl. .................... 381/94.8; 330/257

(58) Field of Classification Search ........... 381/120, 381/94.8, 56; 330/257
See application file for complete search history.

(56) References Cited

U.S. PATENT DOCUMENTS

| | | | | |
|---|---|---|---|---|
| 3,944,944 A | * | 3/1976 | Ellenbecker | 330/149 |
| 4,454,479 A | * | 6/1984 | Spires | 330/263 |
| 4,672,664 A | * | 6/1987 | Boeckmann | 379/395 |
| 5,940,259 A | * | 8/1999 | Robinson | 361/56 |
| 6,434,243 B1 | * | 8/2002 | Read | 381/120 |

* cited by examiner

*Primary Examiner*—Brian T. Pendleton

(57) ABSTRACT

An acoustic signal level limiter provides a telephone handset/headset user protection against loud audible signals generated within a communications system. The acoustic signal limiter comprises an acoustic signal level attenuation circuit and at least one acoustic signal level relay circuit. Once activated, the acoustic signal level attenuation circuit creates an attenuation network that attenuates an electrical acoustic signal transmitted through the communications system. Acoustic signal level relay circuits are activated to further attenuate the electrical acoustical signal to prevent the acoustic signal level attenuation circuit from operating in a deep saturation mode and provide further hearing safety for the telephone headset/handset user. A fuse in series and "Zener Zap" shunting transistor diodes provide assured higher signal level protection.

14 Claims, 8 Drawing Sheets

ACOUSTIC SIGNAL LEVEL LIMITER

BACKGROUND

A. Technical Field

The present invention relates generally to acoustic signal level detection and control, and more particularly, to hearing safety protection in communication devices by limiting the level of an acoustic signal that will be transmitted to a listener through a communication device.

B. Background of the Invention

Proper control of electrical acoustic signal levels within a communication system is desirable in order to ensure high quality communication and hearing safety to individuals using the system. Generally, a telephone handset or headset includes a microphone and a speaker. For example, a telephone headset provides a microphone on an arm that is positioned proximately to a user's mouth and a speaker within an earpiece that is positioned over the user's ear. In order to provide proper communication, the sound level of the audible signal emitted from the speaker should fall within a range of sound intensity. If the sound level is below this intensity range, then a user may not be able to hear or understand what is being said by the remote talker. Comparatively, if the sound level is above this intensity range, then a user may be subjected to increasingly uncomfortable sound levels finally reaching the point of injury. Loud audible signals are of concern in communication devices, such as telephone handsets and headsets, that position a speaker near a user's ear.

These loud audible signals may be caused by a variety of different events. For example, accidental disturbances within a communication connection may cause an electrical signal level to increase dramatically (e.g., a malfunctioning amplifier, intense feedback, incorrect signal source, or phone line shorted to power line). Oftentimes, the transient time of a signal to reach a high level may be very short and a listener may have little or no time to remove an earpiece or other listening device away from her ear before she is exposed to that high level. In the case of a telephone headset user, the listener may have to bring her hand to her ear, which may require a second or two before the earpiece is removed. Also, many headset users spend a large amount of time on the phone. For example, headset users such as telemarketers, receptionists, and operators often spend eight hours a day answering telephone calls and speaking with people over a telephone. Due to this length of time, these individuals are at a higher risk of sound exposure caused by a sudden or constant loud audible signal. Thus, due to the extended time headset users are on telephone calls and the extra time required to remove the headset, headset users are particularly vulnerable to exposure to loud audible signals generated from the headset speaker.

FIG. 1 depicts a varistor 100 that has been used to reduce the maximum level to the speaker and hence the sound exposure. Basically, a varistor 100 is a surge protector that senses peaks within a signal and, in response, creates a shunt path, using diodes, that attenuates these peaks. As shown in FIG. 1, a voltage source 105, with corresponding source impedance 110, provides an electrical signal to an attached load 125 via the varistor 100. Examples of this voltage source 105 include a telephone or telephone adapter and examples of the load include a telephone handset or headset speaker. The varistor 100 has a first diode 115 connected, in parallel, to a second diode 120, each having a corresponding turn-on voltage. This turn-on voltage activates the diode and, typically, is between 0.5–0.7 volts. These diodes 115, 120 are used to shunt the positive and negative halves of an electrical signal through their corresponding paths, after the diode turn-on voltages are reached by the electrical signal received from the voltage source 105.

The first diode 115 is used to shunt the negative half of the electrical signal current and is activated by a magnitude of the negative half exceeding the first diode's turn-on voltage. If this magnitude is below the turn-on voltage, then the first diode 115 remains cut off. However, if the magnitude is above the turn-on voltage, then the first diode 115 is on and conducts current from the voltage source 105 creating a shunt path. The amount of current actually conducted through the shunt path depends on the impedance of the load 125. In any event, the level of the negative half of the electrical signal current received by the load 125 is reduced because of this activated negative shunt path.

The second diode 120 operates in a similar manner as the first diode 115 except that it creates a shunt path for the positive half of the electrical signal received from the voltage source 105. As a result, the magnitude of each half of the electrical signal is attenuated after diodes 115, 120 are turned on. However, as is apparent, the voltage across the load 125 is not totally clamped if the electrical signal power increases. Rather, voltage across the load 125 may continue to increase, although at a much lesser rate due to the clamping effects of the positive and negative shunt paths. This voltage increase across the load 125 is caused by the fact that the resistance levels of the diodes 115, 120 are finally fixed. The level of shunting provided by the diodes 115, 120 is dependent on the ratio of the diode resistance and the load resistance, both of which are finally fixed, resulting in the diodes being unable to adjust the level of shunting provided by these diode paths. Thus, the voltage across the load 125 may continue to rise and produce a very loud audible signal if the electrical signal level is sufficiently high.

The above-discussed problems are caused primarily by the non-linear effects of the two diodes 115, 120. Specifically, the relationship between the current through a diode and the voltage across the diode is nonlinear. As the voltage source reaches the turn on voltage of the two diodes 115, 120, the diodes 115, 120 are activated and shunt current from the load 125. Additionally, the nonlinear characteristics of the activated diodes 115, 120 cause higher distortion across the load 125. Thus, the quality of any audible signal generated by the load 125 is compromised as turn on voltage is approached.

FIG. 2 depicts another circuit that has been used to reduce the electrical signal peaks. As shown in FIG. 2, a discrete transistor circuit 200 is placed in parallel to the first and second diodes 115, 120. The discrete transistor circuit 200 comprises a first transistor 220, a second transistor 225, a first resistor 215 and a second resistor 230. The first transistor 220 base and emitter are connected across voltage source 105. The second transistor 225 is coupled, in parallel, to the voltage source 105 in a similar manner. This discrete transistor circuit 200 is placed in front of the two diodes 115, 120 and is activated by an electrical signal voltage level from the voltage source 105 being above the turn-on voltage of the first and second transistors 220, 225.

The first transistor 220 attenuates the positive half of an electrical signal after the voltage level between the first transistor 220 emitter and base exceeds the first transistor's turn-on voltage. Typically, this transistor turn-on voltage is between 0.5–0.7 volts. Once this first transistor 220 is turned on, an attenuation network is created comprising the first resistor 220 and the resistance ($Rce_1$) between the emitter and the collector of the first transistor 220. This attenuation network functions to decrease the positive voltage at the load 125 by allowing current to flow through the first transistor 220. As the voltage level of the electrical signal increases, the transistor 220 goes into saturation mode and the resistance ($Rce_1$) between the emitter and collector of the first transistor 220 decreases. As a result, because this resistance ($Rce_1$) forms a divider network with the first resistor 215, the current flowing through the first transistor 220 increases; thereby, limiting the relative voltage across the load 125. As the voltage source increases, the saturation level within the first transistor 215 deepens. Hence, the voltage across the load 125 decreases.

The second transistor 225 operates in a similar manner as the first transistor 220 except that it operates on the negative half of the electrical signal from the voltage source 105. Specifically, after the second transistor 225 is turned on, an attenuation network is created comprising the second resistor 230 and the resistance ($Rce_2$) between the collector and emitter of the second transistor 225. Thus, the negative half of the electrical signal is attenuated, resulting in limiting the relative voltage across the load 125 as the voltage level on the electrical signal from the voltage source 105 increases.

Although the use of the two transistors 220, 225 provides better attenuation characteristics than the varistor 100 shown in FIG. 1, the two transistors 220, 225 are unable to sufficiently attenuate a very large signal. This failure results from the saturation characteristics of the two transistors 220, 225. Specifically, if the voltage on the electrical signal increases to a sufficiently high level to drive the transistors 220, 225 into a deep saturation mode, the resistance ($Rce_2$) between the emitter and collector of the transistors 220, 225 becomes fixed. As a result, the two transistors 220, 225 function similar to diodes that operate within the varistor 100 and a resistor network is created. Thus, as the voltage level on an electrical signal increases driving the transistors 220, 225 into deep saturation, the voltage across the load 125 increases.

The first diode 115 and the second diode 120 are still required to provide the Zener short circuit to prevent the output from increasing. In order to compensate for the above-described problem, a varistor 100 may be placed behind the discrete transistor circuit 200. However, the above-described problems regarding varistors are reintroduced. The resistor network resulting from the diodes 115, 120 is unable to clamp the voltage across the load 125, rather only decrease the slope of any voltage increase of the load 125.

FIG. 3 graphically depicts the inability of the above-described prior devices to effectively create a maximum voltage level across the load 125. As shown in FIG. 3, an electrical output voltage signal 305 operating below a turn-on voltage 320 is relatively unaffected by the discrete transistor circuit 200. However, after the turn-on voltage is reached, the rate at which the electrical output voltage signal 310 increases is reduced. If only the varistor 100 is used, then the voltage across the load 125 will continue to rise 325 as the voltage source 105 increases. If the discrete transistor circuit 200 and the varistor 100 are used, then the voltage across the load 125 will initially decline 330. However, once the voltage source 105 is sufficiently high to drive the transistors 220, 225 into deep saturation, then the voltage across the load 125 will start to rise 335. Due to the fixed resistance of the deep saturation characteristics of the transistors 220, 225, the voltage across the load 125 is not absolutely clamped but slowly increases in relation to an increase in the source voltage 105. It is important to note that the output voltage 310 may still continue above a desired clamping level 315.

Accordingly, there is a need for an apparatus that limits an output voltage as the voltage source increases. Additionally, because this apparatus will likely operate in small devices with a limited power, there is an additional need that the apparatus minimize cost, power consumption, and distortion.

SUMMARY OF THE INVENTION

The present invention overcomes the deficiencies and limitations of the prior art by providing a hearing safety system and method that limits an acoustic signal level to a predetermined threshold. In one embodiment, an acoustic signal level limiter circuit is coupled between a voltage source and a load. Within the field of telecommunications, the voltage source may be a telephone or telephone adapter, and the load may be a telephone handset or headset. The acoustic signal level limiter circuit limits electrical signal levels from the voltage source by implementing multiple attenuation networks that are activated as the electrical signal crosses voltage levels. If the electrical signal level is sufficiently high to activate at least one of these attenuation networks, then the electrical signal is attenuated accordingly. As a result of this signal attenuation, the acoustic signal level limiter circuit is able to maintain a maximum signal level threshold through which the electrical signal is prevented from crossing. Ultimately, when the signal level is high enough to exhaust the attenuation potential of the limiter, a combination series fuse and/or shunt short disconnects all output to the load. This maximum signal level threshold protects a user of a communication device (e.g., a telephone headset) from signals that could produce undesirable audio levels.

The acoustic signal level limiter comprises an acoustic signal level attenuation circuit and at least one acoustic signal level relay circuit. The acoustic signal level limiter may be designed to handle various levels of signal overload by adjusting the number of acoustic signal level relay circuits. As the number of acoustic signal level relay circuits integrated within the acoustic signal level limiter increases, the ability of the acoustic signal level limiter is enhanced to protect against extremely high electrical signal levels within the communication system. Thus, the acoustic signal level limiter can be flexibly designed by increasing or decreasing the number of relays to handle different levels of signal overload. Finally, the series fuse and/or shunt short mechanism will disconnect output signals to the speaker load.

The acoustic signal level attenuation circuit is a discrete transistor circuit that operates to detect high electrical signal levels, and in response to a detected high level, attenuate the signal level to a proper level. However, the transistors within the acoustic signal level attenuation circuit will operate in a deep saturation mode if the electrical signal level is too high. Deeply saturated transistors are unable to effectively attenuate the electrical signal resulting in the attenuation network, in which the transistors operate, to function similar to a resistor network. Specifically, the effective resistance of transistors in deep saturation is constant resulting in a fixed resistor network that cannot adjust the amount of attenuation on the electrical signal. As a result, the voltage across the load increase, although at a lesser rate, as the electrical signal level from the voltage source increases.

An acoustic signal level relay circuit is integrated within the acoustic signal level limiter to enhance the operation of the acoustic signal level attenuation circuit. The acoustic signal level relay circuit inhibits the acoustic signal level attenuation circuit from entering a deep saturation mode. Specifically, once activated, the acoustic signal level relay circuit further attenuates the electrical signal from the voltage source in order to prevent the electrical signal from deeply saturating the transistors within acoustic signal level attenuation circuit and further reduce the voltage level across the load. However, like the transistors in the acoustic signal level attenuation circuit, the transistors within the acoustic signal level relay circuit may be deeply saturated if the electrical signal level is sufficiently high. The integration of the acoustic signal level relay circuit increases the required level at the voltage source to saturate the acoustic signal level attenuation circuit due to the fact that it is further attenuating the electrical signal from the voltage source.

Additional acoustic signal level relay circuits may be integrated within the acoustic signal level limiter in order to further increase the required level at the voltage source to saturate the acoustic signal level attenuation circuit. As a result, a manufacturer may design the acoustic signal level limiter according to the environment in which it operates and the particular needs of the user. For example, a telephone communications headset may require only a certain number of acoustic signal level relay circuits in order to protect against large signals propagating through a telephone line. At signal levels well beyond what is to be expected in an application, the series fuse/shunt short mechanism of the invention provides the ultimate fail safe, disabling the headset speaker drive. In addition to establishing a maximum electrical signal level threshold, the acoustic signal level limiter offers other performance advantages over current devices that are being implemented.

The acoustic signal level limiter takes advantage of specific characteristics of transistors within the acoustic signal level attenuation circuit and the acoustic signal level relay circuit(s) to provide enhanced signal level clamping effects. For example, the transistor network introduces less distortion than the varistor on the electrical signal as the electrical signal voltage level approaches the turn-on voltage. Also, the transistor circuits, rather than providing a simple flat topped clipping of the diodes, generate a concave topped waveform containing less energy.

The characteristics of the transistors may be modified by using various types of transistors (e.g. bipolar junction transistors (BJTs) or field effect transistors (FETs)). For instance, junction field effect transistors (JFETs) may be implemented to designate different pinch-off voltages, and correspondingly, manipulate the maximum signal level threshold allowed across the load. Additionally, the acoustic signal level limiter may be fabricated to provide a Zener diode effect on specific transistors. This Zener diode effect or "Zener Zap" is an integrated bipolar technology effect that provides a fuse that will trigger if a particular current level is reached within the circuit. Thus, a "Zener Zap" or other fuse device may be provided to isolate the load from the voltage source in the event the electrical signal level is too high for the acoustic signal level limiter to effectively attenuate the electrical signal.

The features and advantages described in this summary and the following detailed description are not all-inclusive, and particularly, many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structure and devices are shown in block diagram form in order to avoid obscuring the invention. Moreover, it should be noted that the language used in this disclosure has been principally selected for readability and instructional purposes, and may not have been selected to delineate or circumscribe the inventive subject matter, resort to the claims being necessary to determine such inventive subject matter.

A. System Overview

Figure 1:
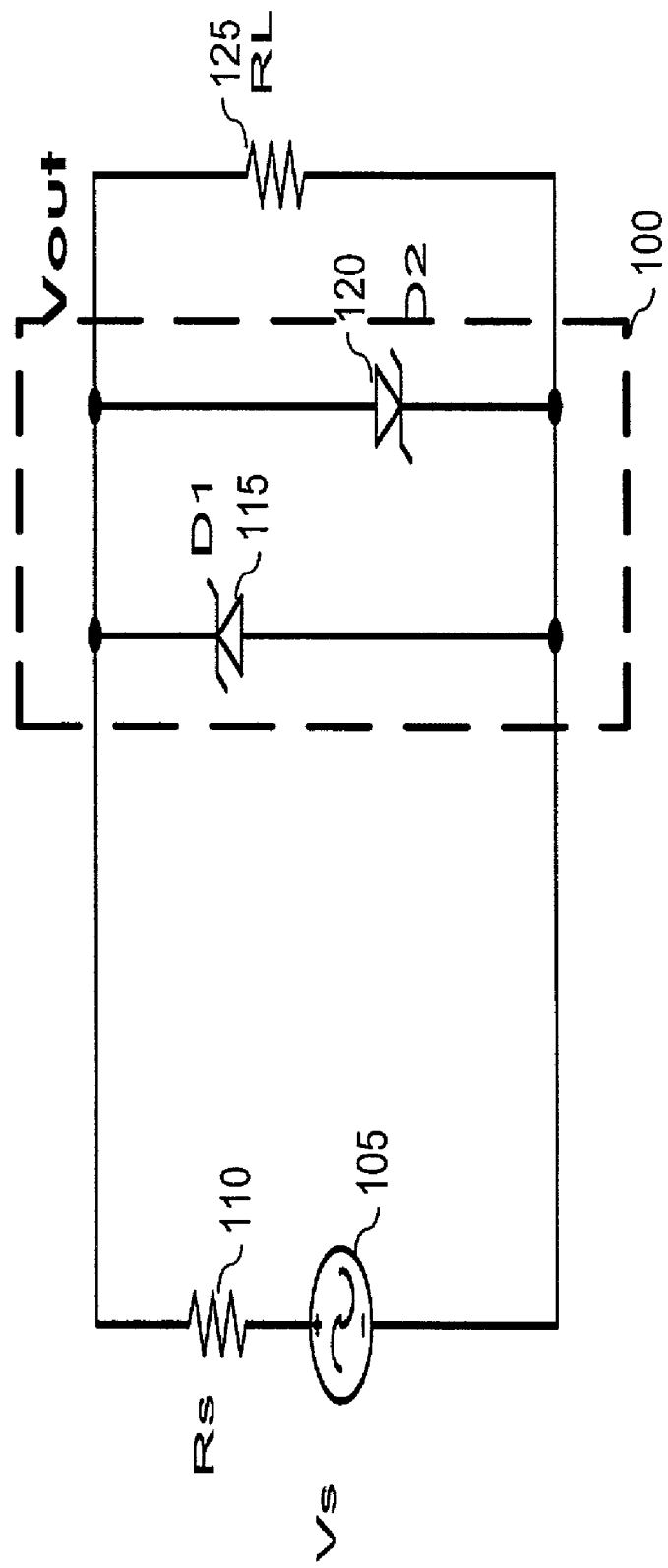
FIG. 1 is a circuit diagram of a varistor operable within various communication devices.
Figure 2:
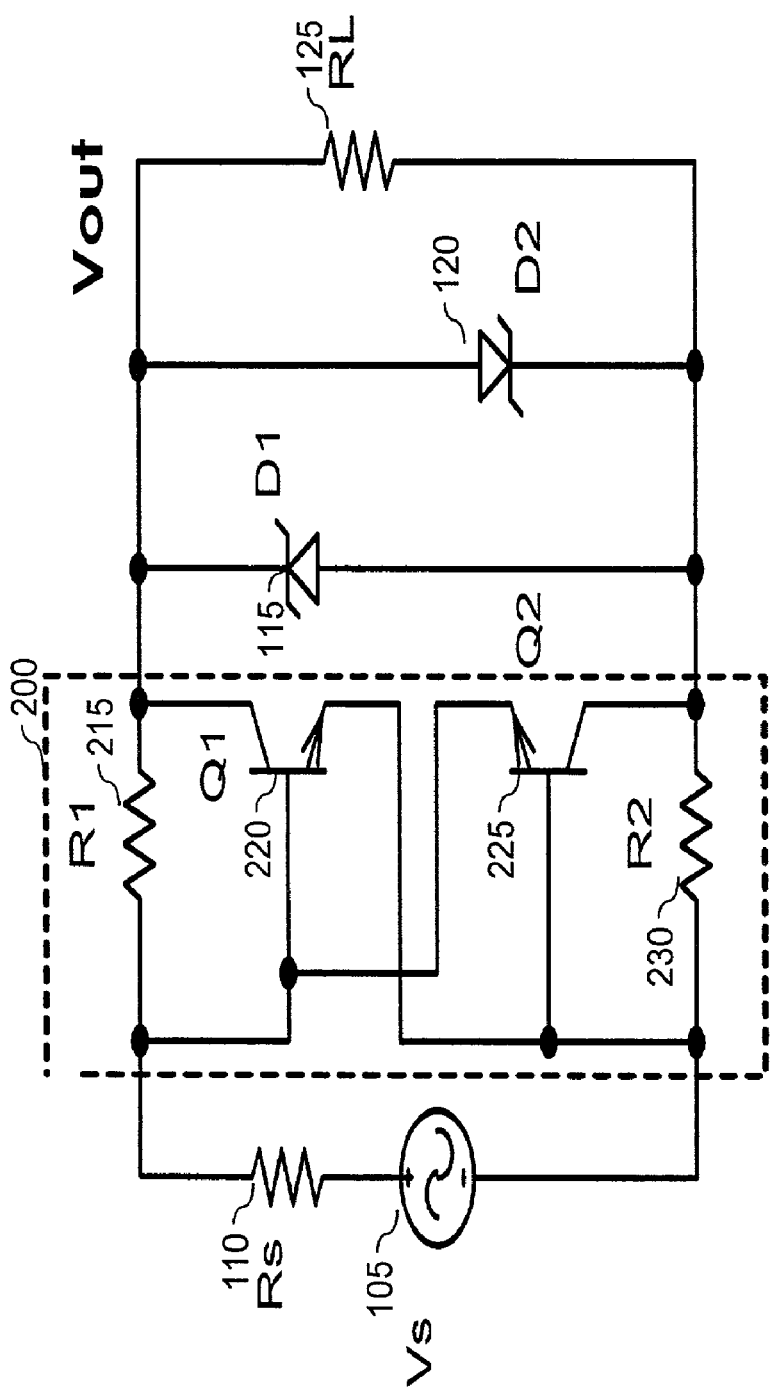
FIG. 2 is a circuit diagram of a discrete transistor/varistor circuit operable within various communication devices.
Figure 3:
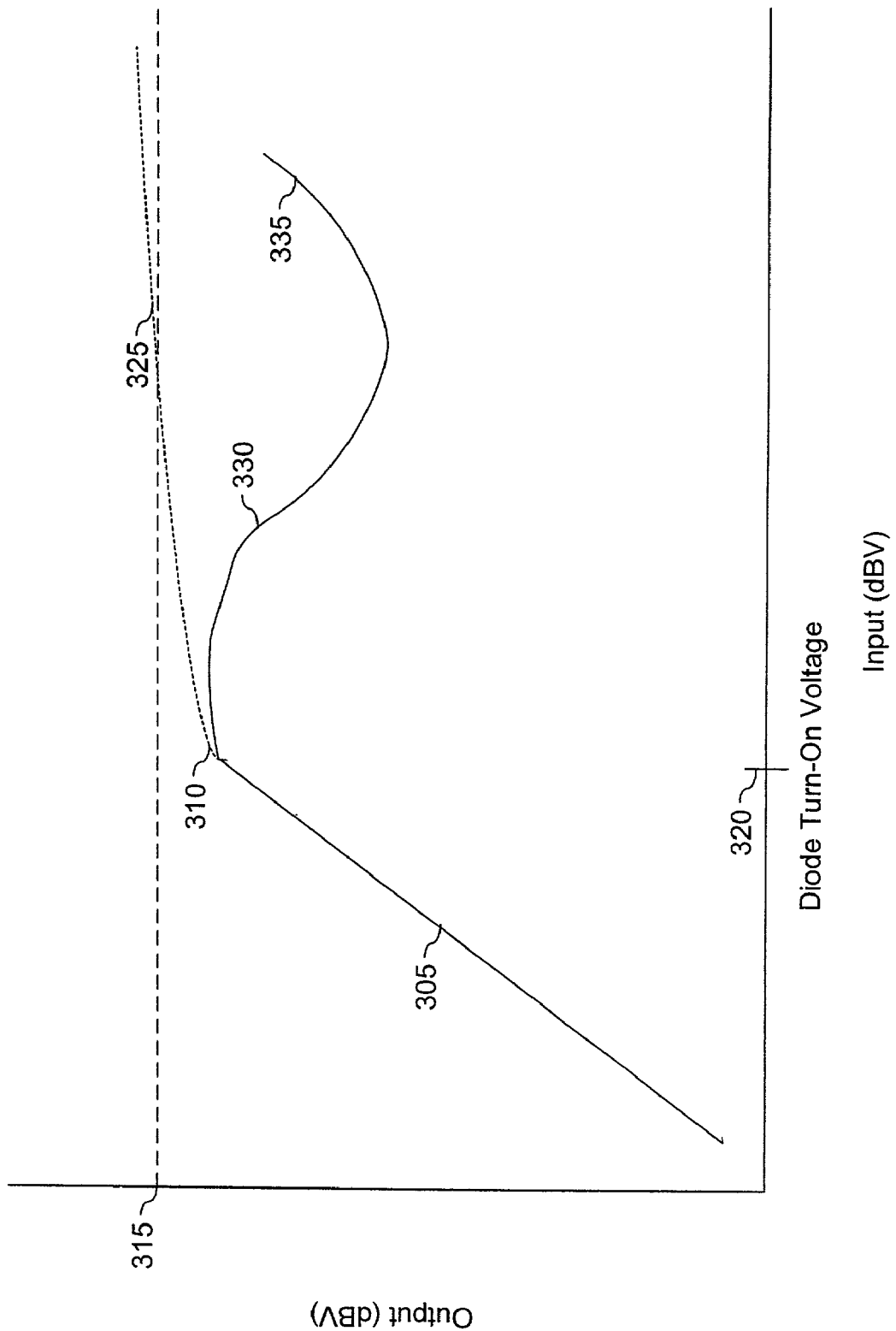
FIG. 3 is a graphical diagram of the output voltage response of the varistor, and discrete transistor/varistor circuit.
Figure 4:
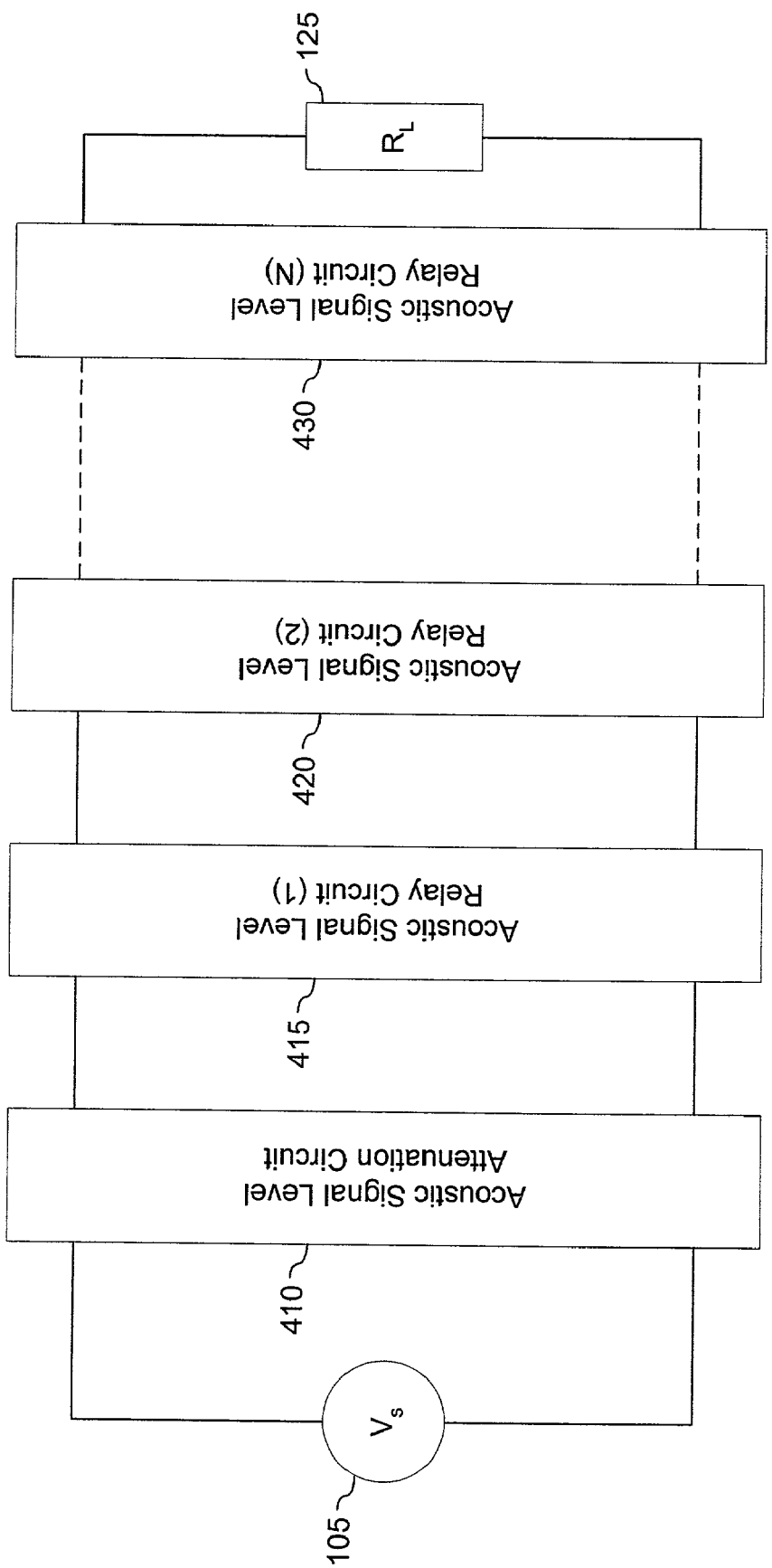
FIG. 4 is a general block diagram of an acoustic signal level limiter apparatus.

The present invention limits the level of an incoming electrical acoustic signal to a particular maximum threshold. FIG. 4 is a general block diagram showing an embodiment of the present invention. As shown, this embodiment operates between a voltage source 105 and a load 125. Although the present invention may operate in a number of different environments, the following description will focus on telephone communication applications. However, the present invention should not be limited to the environment, rather, it may be applied in any environment wherein control of electrical signals is necessary. Additionally, the present invention will be described in terms of hardware components (e.g., transistors, diodes and resistors), but should not be limited to this description. Specifically, the present invention may be implemented using a number of different types of technology including hardware, software and firmware (e.g., digital signal processing implementations).

The voltage source 105 transmits an electrical signal that is eventually delivered to an electrical load 125. Examples of this voltage source 105 include telephones and telephone adapters. Examples of the electrical load 125 include telephone headset and handset speakers. The voltage source 105 is coupled to an acoustic signal level attenuation circuit 410. This acoustic signal level attenuation circuit 410 is coupled to one or more acoustic signal level relay circuits. For example, the acoustic signal level attenuation circuit 410 may be coupled, in parallel, to a first acoustic signal relay circuit 415. This first acoustic signal relay circuit 415 may be coupled, in parallel, to a second acoustic signal level relay circuit 420. These parallel connections of acoustic signal level relay circuits may continue depending on the requirements of the voltage source 105 and the load 125. Finally, the load 125 is coupled, in parallel, to the Nth acoustic signal level relay circuit 430. It is important to note that there may be only the first acoustic signal level attenuation circuits 415 placed behind the acoustic signal level attenuation circuit 410.

The acoustic signal level attenuation circuit 410 initially detects peaks within an electrical signal from the voltage source 105. In response to a peak being above a first threshold, the acoustic signal level attenuation circuit 410 reduces the level of the electrical signal. This signal reduction reduces the rate at which the signal level increases at the load 125 in relation to a signal level at the voltage source 105. Thus, although the acoustic signal level attenuation circuit 410 may reduce the intensity of the acoustic signal from the load 125, this acoustic signal intensity may still cross an undesirable threshold if the voltage source 105 transmits a sufficiently strong electrical signal. Accordingly, one or more acoustic signal level relay circuits are used to further attenuate the electrical signal transmitted from the voltage source 105 in order to further reduce the rate at which the voltage across the load 125 increases relative to the voltage source 105.

The first acoustic signal level relay circuit 415 is activated in response to peaks within the electrical signal crossing a second threshold. Upon activation, the first acoustic signal level relay circuit 415 attenuates the electrical signal; thereby, further reducing the rate at which voltage across the load 125 increases relative to the voltage source 105. Upon activation, the first acoustic signal level relay circuit 415 opens an attenuation network that adjusts the level of attenuation dependent on the level on the electrical signal. (In contrast, a varistor acts as a resistor network that cannot adjust attenuation levels because the resistance levels of the diodes within the resistor network are fixed.) However, if the electrical signal level becomes too high, the attenuation network in the first acoustic signal level relay circuit 415 will deeply saturate. As a result of this deep saturation, the attenuation network operates as a resistor network; thereby, allowing the voltage across the load 125 to increase (although at a relatively lesser rate).

In the illustrated embodiment, a second acoustic signal level relay circuit 420 is coupled, in parallel, to the acoustic signal level attenuation circuit 410 and the first acoustic signal level relay circuit 415 in order to compensate for electrical signals driving the attenuation network in the first acoustic signal level relay 415 into deep saturation. The second acoustic signal level relay circuit 420 provides a second attenuation network that is activated when the electrical signal crosses a third threshold. This third threshold is below the level required to drive the first attenuation network into deep saturation. Once activated, this second attenuation network further attenuates the electrical signal. As a result, the activation of the second acoustic signal level relay circuit 420 further increases the rate at which the electrical signal is attenuated. Thus, the voltage across the load 125 is further reduced in relation to the voltage source 105.

The voltage across the load 125 may be further suppressed by coupling more acoustic signal level relay circuits. A maximum electrical signal level threshold may be created by the addition of these acoustic signal level relay circuits. Thus, as shown in FIG. 4, these acoustic signal level relay circuits may be coupled, in parallel, to each other up to the Nth acoustic signal level relay circuit 430. Finally, the load 125 is coupled to the array of acoustic signal level relay circuits (if multiple attenuation circuits are used). The acoustic signal level relay circuits may be activated sequentially or activated virtually instantaneously.

Figure 5:
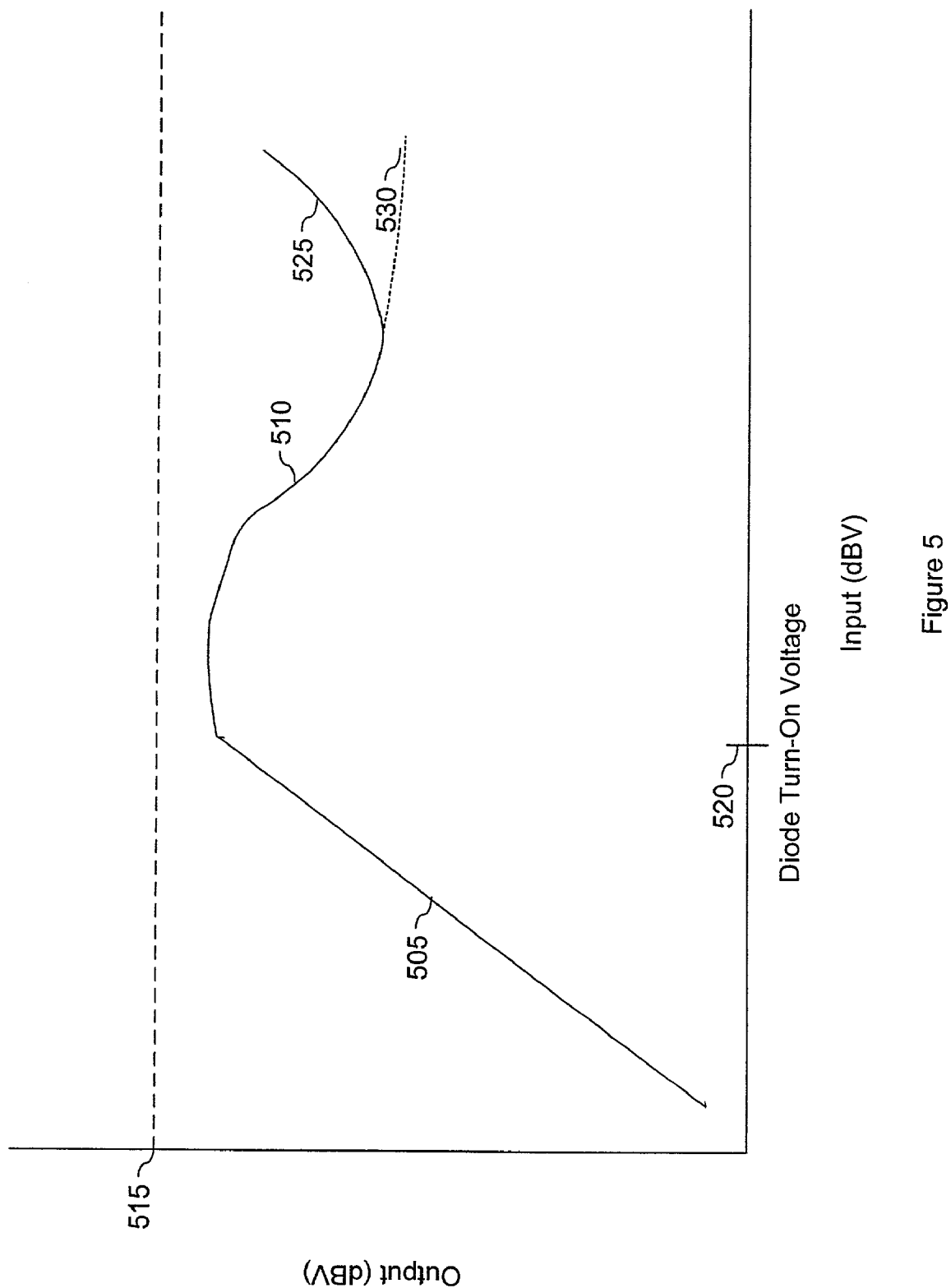
FIG. 5 is a graphical diagram of the output voltage response of the acoustic signal level limiter apparatus.

FIG. 5 shows this maximum electrical signal level at the load 125 by plotting the output voltage (voltage across the load 125) versus the input voltage (voltage source 105). Prior to activating the acoustic signal level attenuation circuit 410, the output voltage 505 increases approximately at the same rate the input voltage increases. In response to the electrical signal reaching the activation level 520 of the acoustic signal level attenuation circuit 410, the attenuation network within acoustic signal level attenuation circuit 410 is activated and the electrical signal is attenuated accordingly. This effect is shown on FIG. 5 by the drastic reduction in the slope of the curve at the activation level 520. As the input voltage increases beyond the activation level 520, other acoustic signal level relay circuits are activated. Thus, as the number of activated acoustic signal level relay circuits increases, the relative attenuation on the electrical signal will increase and cause the load voltage to continually decrease 530.

FIG. 5 shows that this maximum electrical signal level at the load 125 occurs as a result of these activated acoustic signal level relay circuits. In fact, as the number of activated attenuation circuits increases, it was shown that the voltage level across the load 125 decreased due to the total effects of the attenuation circuits and that a higher voltage source 105 was required to deeply saturate the transistors causing the load voltage to rise 525. In order to prevent deeply saturating the transistors and the resulting increase in load voltage at this high voltage source 105 level, additional acoustic signal level relay circuits may be added to ensure the load voltage does not increase at this high voltage source 105 level. As a result, the emitted audible signal from the load 125 never becomes loud enough to exceed the desired limits. The following sections explain each of the above-described circuits in more detail.

B. Acoustic Signal Level Attenuation Circuit

Figure 6:
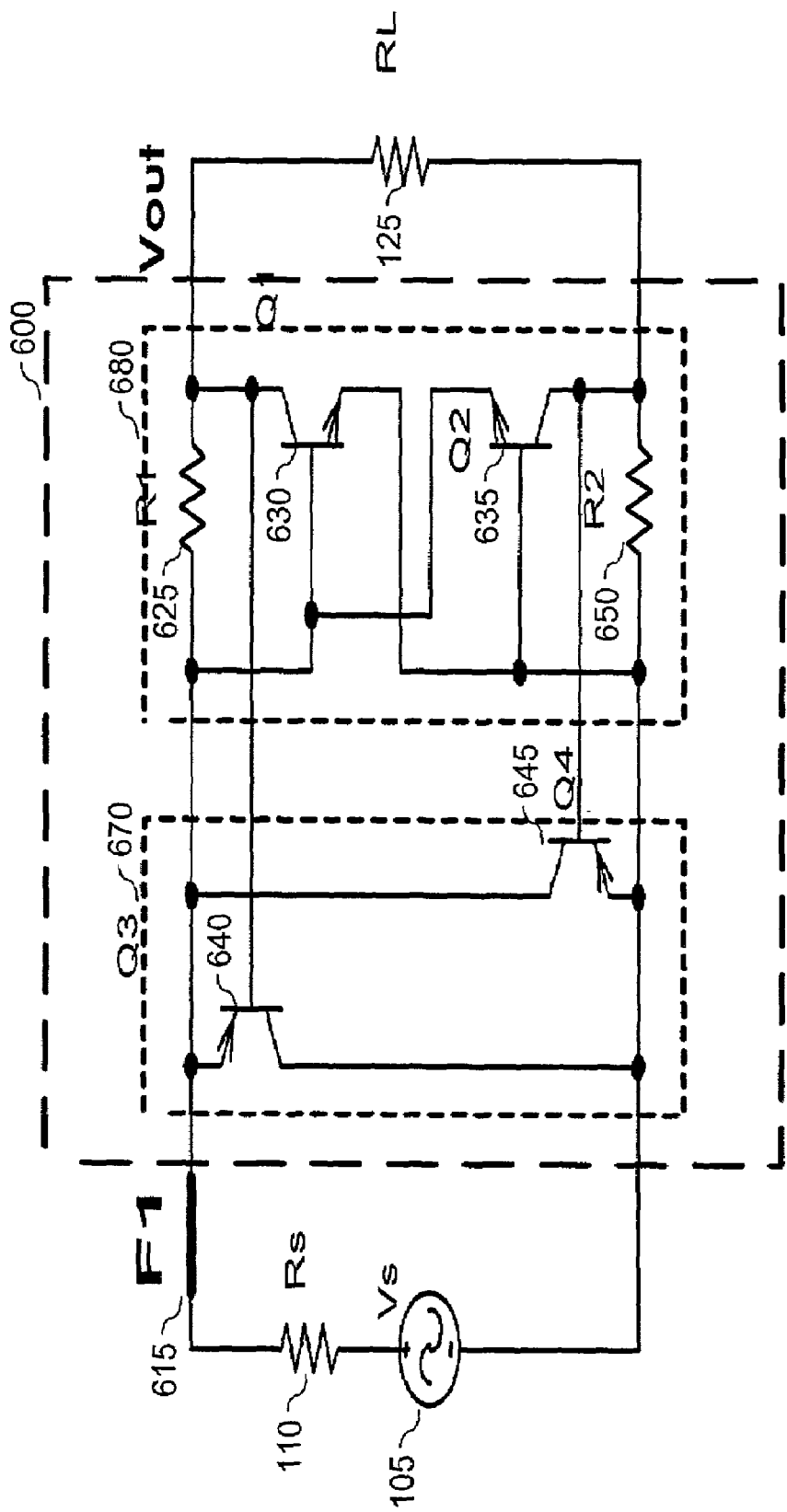
FIG. 6 is a circuit diagram of a first embodiment of the acoustic signal level limiter apparatus.

FIG. 6 is a circuit diagram of an embodiment of the present invention. An acoustic signal level limiter circuit 600 is coupled between a load 125 and a voltage source 125. As was the case above, this embodiment will be described as operating in a telephone communication environment. However, the present invention should not be limited to this environment, but rather, it may function in numerous situations where control of electrical signals is necessary. Thus, within this environment, the load 125 may be a telephone headset or handset. The voltage source 105, with a corresponding source impedance 110, may be a telephone or telephone adapter.

The voltage source 105 is coupled, in parallel, to an acoustic signal level attenuation circuit 680 and a first acoustic signal level relay circuit 670. The acoustic signal level attenuation circuit 680 is activated by an electrical signal peak from the voltage source 105 crossing a first threshold. The first acoustic signal level relay circuit 670 is activated by an electrical signal peak from the voltage source 105 crossing a second threshold that is higher than the first threshold.

The acoustic signal level attenuation circuit 680 comprises a first transistor 630, a second transistor 635, a first resistor 625 and a second resistor 650. The base of the first transistor 630 is coupled to the positive side of voltage source 105, and its emitter is coupled to the negative side of the voltage source 105. The second transistor 635 is coupled in parallel to the voltage source 635, with its base coupled to the negative side of the voltage source 105 and its emitter coupled to the positive side of the voltage source 105. The acoustic signal level attenuation circuit 680 is activated by the electrical signal from the voltage source 105 being sufficiently high to turn on the first transistor 630 and the second transistor 635. Typically, this level is between 0.5–0.7 volts. Once activated, the acoustic signal level attenuation circuit 680 attenuates the electrical signal in the following manner.

The first transistor 630 attenuates the positive half of an electrical signal from the voltage source 105 after the voltage level between the first transistor 630 emitter and base exceeds a transistor turn-on voltage. Once this first transistor 630 is turned on, a first attenuation network is created comprising the first resistor 625 and the resistance ($Rce_1$) between the emitter and the collector of the first transistor 630. This first attenuation network functions to decrease the positive voltage at the load 125 by allowing current to flow through the first transistor 630. As the voltage level on the analog signal increase, the resistance ($Rce_1$) between the emitter and collector of the first transistor decreases. As a result, because this resistance ($Rce_1$) forms a divider network with the first resistor 625, the current flowing through the first transistor increases; thereby, limiting the relative voltage across the load 125. Specifically, as the voltage level of the electrical signal increases, the resistance ($Rce_1$) decreases. Because the first resistor 625 is fixed, a larger percentage of the electrical signal flows through the first transistor 630 and a lesser percentage of the electrical signal flows through the load 125.

The second transistor 635 operates in a similar manner as the first transistor 630 except that it operates on the negative half of the electrical signal from the voltage source 105. Specifically, after the second transistor 635 is turned on, in a similar manner described above, a second attenuation network is created comprising the second resistor 650 and the resistance ($Rce_2$) between the collector and emitter of the second transistor 635. Like the first attenuation network, the second attenuation network adjusts the percentage of the electrical signal flowing through the second transistor 635 depending on the strength of the electrical signal. Thus, the negative half of the analog signal is attenuated, resulting in limiting the relative voltage across the load 125 as the voltage level on the analog signal from the voltage source 105 increases.

The acoustic signal level attenuation circuit 680 effectively attenuates the electrical signal as long as the electrical signal does not put the first transistor 630 and the second transistor 635 into deep saturation modes. Deep saturation occurs when the electrical signal voltage level is sufficiently high to drive a collector-emitter resistances (Rce) to their minimum resistance levels. Thus, at deep saturation, the collector-emitter resistances (Rce) of the first transistor 630 and the second transistor 635 remain constant as the electrical signal voltage level increases. The attenuation network operates as a resistor network causing the voltage across the load 125 to increase. In order to attempt to prevent the acoustical signal level clamping circuit 680 from going into deep saturation, an acoustic signal level relay circuit 670 is coupled to the acoustic signal level attenuation circuit 680 and the voltage source 105.

C. Acoustic Signal Level Relay Circuit

The acoustic signal level relay circuit 670 comprises a third transistor 640 and a fourth transistor 645. The third transistor 640 emitter is coupled to the positive side of the voltage source 105, the collector of the fourth transistor 645, the base of the first transistor 630 and the first resistor 625; the base is coupled to the first resistor 625 and the collector of the first transistor 630; and the collector is coupled to the negative side of the voltage source 105, the emitter of the fourth transistor 645, the emitter of the first transistor 630, and the second resistor 650. The fourth transistor 645 emitter is coupled to the negative side of the voltage source 105, the collector of the third transistor 640, the emitter of the first transistor 630, and the second resistor 650; the base is coupled to the second resistor 650 and the collector on the second transistor 635; and the collector is coupled to the positive side of voltage source 105, the emitter of the third transistor 640, the base of the first transistor 630, and the first resistor 625. The acoustic signal level relay circuit 670 is activated when the voltage drops across the first resistor 625 and the second resistor 650 are sufficient to turn on the third transistor 640 and the fourth transistor 645. As described above, this voltage drop required to turn on the transistors is generally between 0.5–0.7 volts. Once activated, the acoustic signal level relay circuit 670 applies further attenuation to an electrical signal from the voltage source 105.

The third transistor 640 further attenuates the positive half of the electrical signal from the voltage source 105 after a voltage drop across the first resistor 625 exceeds the transistor turn-on voltage. Once this third transistor 640 is turned on, a third attenuation network is created comprising the second resistor 625 and the resistance ($Rce_3$) between the emitter and the collector of the third transistor 640. This third attenuation network functions to decrease the magnitude of the positive voltage at the load 125 by allowing current to flow through the third transistor 630. As the voltage level of the electrical source 105 increases, the resistance ($Rce_3$) between the emitter and collector of the third transistor 640 decreases. As a result, the current flowing through the third transistor 640 increases; thereby, limiting the relative voltage across the load 125. Specifically, as the voltage level of the electrical signal increases, the resistance ($Rce_3$) decreases. Then, a larger percentage of the electrical signal flows through the third transistor 640 and a lesser percentage of the electrical signal flows through the load 125.

The fourth transistor 645 operates in a similar manner as the third transistor 640 except that it operates on the negative half of the electrical signal from the voltage source 105. Specifically, after the fourth transistor 645 is turned on by a sufficient voltage drop across the second resistor 650, a fourth attenuation network is created comprising the first resistor 625 and the resistance ($Rce_4$) between the collector and emitter of the fourth transistor 645. Like the third attenuation network, the fourth attenuation network adjusts the attenuation level on the electrical signal, but instead, operates on the negative half of the electrical signal. Thus, the negative half of the electrical signal is attenuated, resulting in limiting the relative voltage across the load 125 as the voltage level on the electrical signal from the voltage source 105 increases.

This first acoustic signal level relay circuit 670 provides an extra layer of protection and raises the voltage level from the voltage source 105 to put the acoustic signal level limiter 600 into a deep saturation mode. In order to protect a user from electrical signals above this level, a fuse 615 is coupled to the voltage source. The fuse 615 is triggered when the voltage level on an electrical signal crosses a particularly large level that may still injure a user in spite of the acoustic signal level limiter 600. However, the protection offered by the acoustic signal level limiter 600 may be heightened by providing multiple layers of acoustic signal level relay circuits.

The first acoustic signal level relay circuit 670 offers a number of advantages over currently used varistors. First, as already described above, the transistors 640, 645 within first acoustic signal level relay circuit 670 provide a variable resistance that adjusts as the level on the electrical signal fluctuates. Thus, as the electrical signal becomes stronger, a higher percentage of the electrical signal is attenuated. Comparatively, the diodes 115, 120 within varistor 100 have a fixed resistance and the attenuation within the corresponding resistor networks is fixed.

Second, the transistors 640, 645 within the first acoustic signal level relay circuit 670 operate as an automatic attenuation control. The higher the voltage source 105 rises the higher the resulting attenuation on the electrical signal. As a result, the voltage across the load 125, and subsequent audible signal, is better controlled and users will not be exposed to very large electrical signal levels transmitted by the voltage source 105.

D. Multiple Integrated Acoustic Signal Level Relay Circuits

Figure 7:
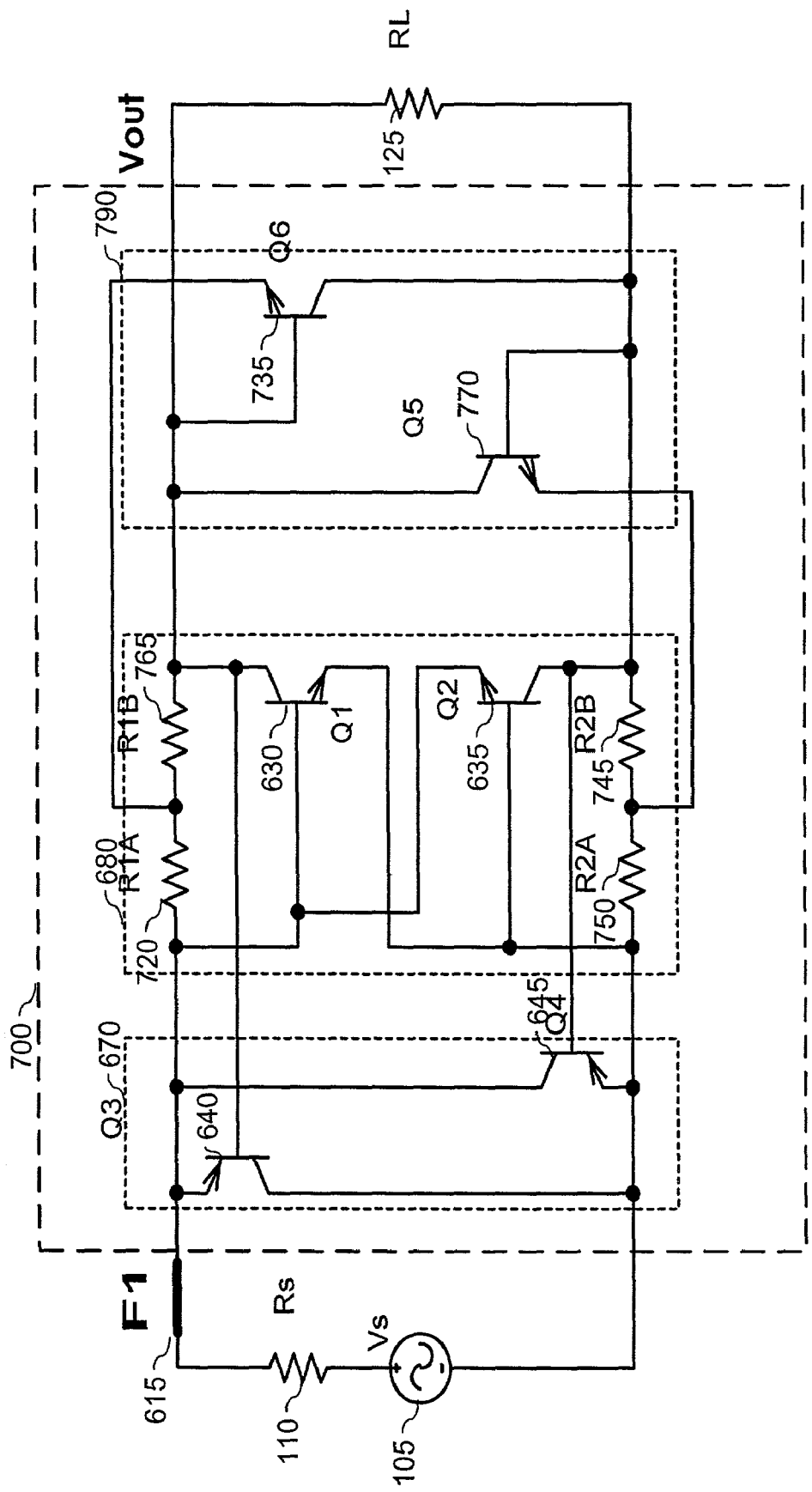
FIG. 7 is a circuit diagram of a second embodiment of the acoustic signal level limiter apparatus.

FIG. 7 shows a circuit diagram of an acoustic signal level limiter 700 comprising an acoustic signal attenuation circuit 680, a first acoustic signal relay circuit 670, and a second acoustic signal relay circuit 790. The second acoustic signal level relay circuit comprises a fifth transistor 770, a sixth transistor 735, a third resistor 765, and a fourth resistor 745. The fifth transistor 770 emitter is coupled between the second resistor 750 and the fourth resistor 745; the base is coupled to the collector of the second transistor 635, the collector of the sixth transistor 735 and the fourth resistor 745; and, the collector is coupled to the base of the sixth transistor 735, the collector of the first transistor 630, and the third resistor 765. The sixth transistor 735 emitter is coupled between the first resistor 720 and the third resistor 765; the base is coupled to the collector of the fifth transistor 770, the collector of the first transistor 630 and the third resistor 765; and, the collector is coupled to the base of the fifth transistor 770, the collector on the second transistor 635 and the fourth resistor 745. The second acoustic signal relay circuit 790 is activated when the voltage drops across the third resistor 765 and the fourth resistor 745 are sufficient to turn on the fifth transistor 770 and the sixth transistor 735. As described above, this voltage drop required to turn on the transistors 735, 770 is generally between 0.5–0.7 volts. Once activated, the second acoustic signal relay circuit 790 applies even further attenuation to an electrical signal from the voltage source 105.

The second acoustic signal level relay circuit 790 operates similarly to the first acoustic signal level relay circuit 670 to provide further attenuation on the electrical signal from the voltage source 105. Specifically, the fifth transistor 770 further attenuates the negative half of the electrical signal from the voltage source 105 after a voltage drop across the fourth resistor 745 exceeds the transistor turn-on voltage. Once this fifth transistor 770 is turned on, a fifth attenuation network is created comprising the fourth resistor 745 and the resistance ($Rce_5$) between the emitter and the collector of the fifth transistor 770. This fifth attenuation network functions to even further decrease the magnitude of the negative voltage at the load 125 by allowing current to flow through the fifth transistor 770. As the voltage level on the electrical source 105 increases, the resistance ($Rce_5$) between the emitter and collector of the fifth transistor 770 decreases. As a result, because this resistance ($Rce_5$) forms a divider network with the fourth resistor 745, the current flowing through the fifth transistor 770 increases; thereby, limiting the relative voltage across the load 125. Specifically, as the voltage level of the electrical signal increases, the resistance ($Rce_3$) decreases, and because the fourth resistor 745 is fixed, a larger percentage of the electrical signal flows through the fifth transistor 770 and a lesser percentage of the electrical signal flows through the load 125.

The sixth transistor 735 operates in a similar manner as the fifth transistor 770 except that it operates on the positive half of the electrical signal from the voltage source 105. Specifically, after the sixth transistor 735 is turned on by a particular voltage drop across the third resistor 765, a sixth attenuation network is created comprising the third resistor 765 and the resistance ($Rce_6$) between the collector and emitter of the sixth transistor 735. Like the fifth attenuation network, the sixth attenuation network adjusts the attenuation level on the electrical signal, but instead, operates on positive half of the electrical signal. Thus, positive half of the electrical signal is attenuated, resulting in limiting the relative voltage across the load 125 as the voltage level on the electrical signal from the voltage source 105 increases.

The second acoustic signal relay circuit 790 further increases the required voltage level on the voltage source 105 to drive the acoustic signal level attenuation circuit 680 into a deep saturation mode. This increase is due to the further attenuation provided by the second acoustic signal relay circuit 790. Thus, the trigger level on the fuse 615 may be increased because of the heightened protection provided by the acoustic signal level limiter 700 having a second acoustic signal level relay circuit 790.

Figure 8:
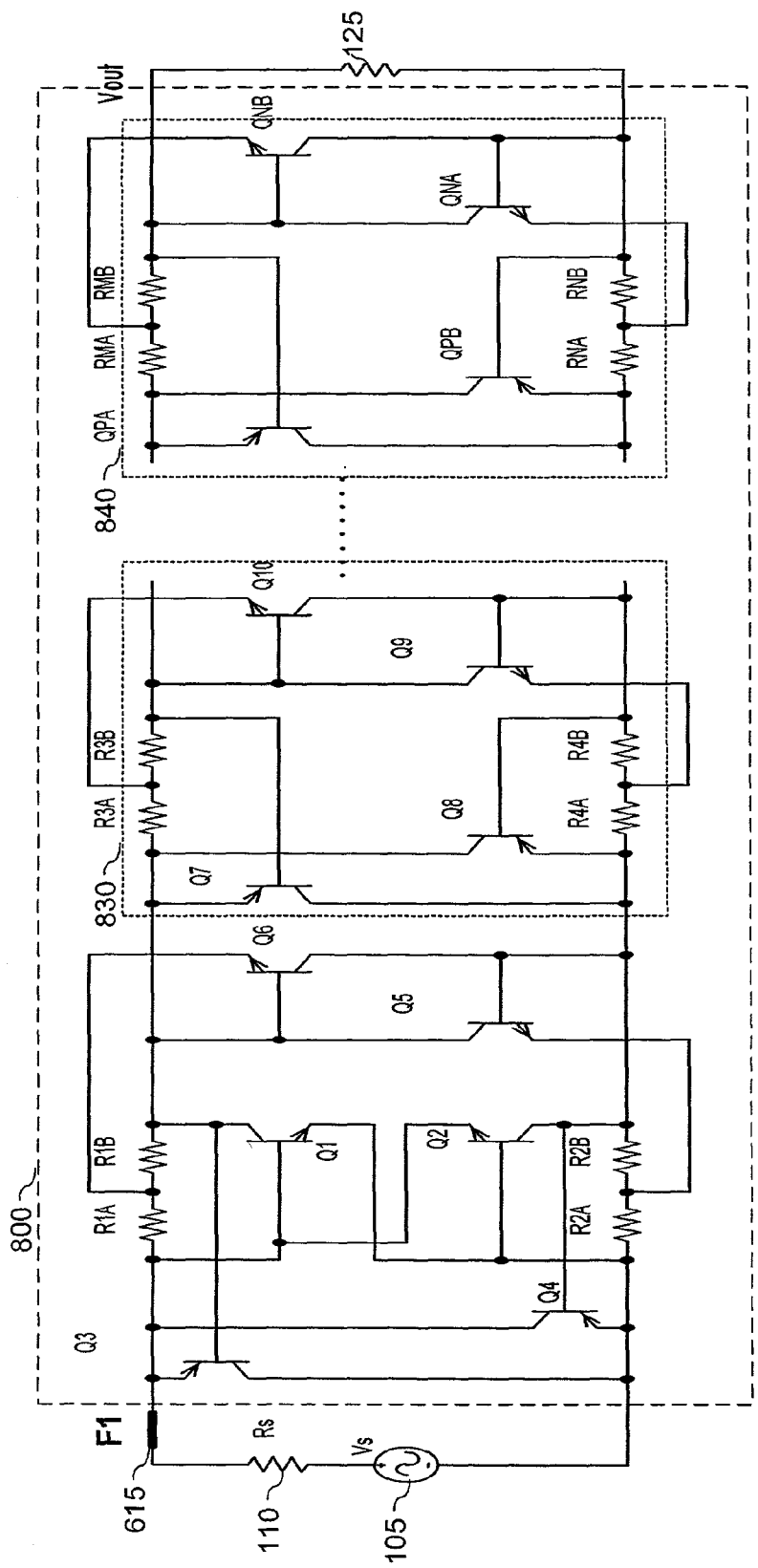
FIG. 8 is a circuit diagram of a third embodiment of the acoustic signal level limiter apparatus.

The acoustic signal level limiter 800 may be further enhanced by adding even more layers of acoustic signal level relay circuits. FIG. 8 shows an example of an acoustic signal level limiter apparatus with N number of acoustic signal level relay circuits. As shown, the acoustic signal level limiter may include a large number of acoustic signal level relay circuits to increase the level of attenuation on the electrical signal from voltage source 105. The acoustic signal level relay circuits are coupled within the acoustic signal level limiter 800 in a similar manner as described above. For example, third and fourth acoustic signal relay circuits 830 are coupled within the acoustic signal relay circuits in the same manner as the first acoustic signal relay circuit 670 and the second acoustic relay circuit 790. Accordingly, N and N-1 acoustic signal level relay circuits 840 follow the same coupling procedure within the acoustic signal level limiter 800.

The characteristics of these acoustic signal relay circuits may be modified by adjusting the resistance levels of the resistors operating within the attenuation networks. Also, different types of transistors (e.g., bipolar junction transistors (BJTs) and field-effect transistors (FETs)) may be implemented within the design to adjust turn-on levels and pinch-off voltages. For example, junction field-effect transistors (JFETs) may be used to adjust the level of attenuation and turn-on voltages provided by transistors within an attenuation network. Specifically, the pinch-off voltages on JFETs may be adjusted to change the maximum voltage level threshold across the load 125

A finite number of rely circuits in a given application means that a current level can be reached that will result in limiter failure modes. It is necessary to insure that any failure mode is prevented from delivering unsafe voltage output to the load. It is essential that signals are not passed to the load if the limiter function is not operational. The invention provides two methods to achieve ultimate failsafe operation. These are series fusing and shunt shorting of the signal with relation to the load.

Firstly, proper series fusing will insure that the load is disconnected before the limiter circuit establishes a failure mode. When the limiter circuit conducts large current over a short amount of the time, the lowest thermal mass item in the circuit experiences the most energy. For example, in a typical IC package, 1 mil diameter gold bond wires fuse open or melt. These wires connect the package pins to the ASIC die bonding pads so when these input wires fuse, the headset earphone signal path is opened.

Secondly, a process called a "Zener Zap" can be incorporated in a manner that provides short circuiting of the output at a desired high energy level. The "Zener Zap" occurs when sufficiently high power is produced across semiconductor diode junctions in either a forward or reverse direction. The semiconductor diode junction will breakdown if this power level is sustained for a sufficient period of time and the junction will be finally breached. Specifically, the conducting semiconductor may be heated by this power level in excess of 200 degrees Celsius. The on-chip interconnect metal which contacts these junctions is also heated until the metal liquefies and the metal atoms are drawn through the semiconductor junction. This process may occur very quickly because the metal atoms create a metal bridge or short at the junction.

This resistance of this short depends on various factors including the amount of metal atoms at the semiconductor junction and the amount of time the energy remains above the thermal melting point in the junction prior to breech. The short is permanent and its resistance level may vary from a couple ohms up to approximately 25 ohms, much less than the impedance of the acoustic signal level limiter and load. In one design of the acoustic signal level limiter, the corners of the transistor layout base and emitter contacts have been optimized for both current crowding in order to force localized contact heating and to provide a large source of contact metal to precipitate a low ohmic short.

As will be understood by those familiar with the art, the invention may be embodied in other specific forms without departing from the spirit or essential characteristics thereof. For example, the particular division of functionality between the various modules, circuits, or components may differ from that described herein, given the variety of software hardware platforms that may be used to practice the invention. For example, the hardware implementations include custom ASICs, discrete logic, FPGAs, PLAs, or DSP with appropriate software programming. Finally the particular naming of the circuit elements is not mandatory or significant, and the mechanisms that implement the invention or its features may have different names or formats. Accordingly, the disclosure of the present invention is intended to be illustrative, but not limiting, of the scope of the invention, which is set forth in the following claims.

We claim:

1. A signal level limiting apparatus, comprising:
    a signal level attenuation circuit comprising a first switch having first and second transistors adapted to receive an electrical signal and to respectively detect a voltage on positive and negative halves thereof and to activate a first attenuation network to attenuate the electrical signal in response to a signal level of the electrical signal crossing a first threshold;
    a first signal level relay circuit coupled to receive the electrical signal, that activates a second attenuation network to attenuate the electrical signal in response to the signal level of the electrical signal crossing a second threshold; and,
    means for reducing the signal level to zero after the signal level exceeds a third threshold greater than the first and second thresholds.

2. The apparatus of claim 1, wherein the first threshold and the second threshold are equal.

3. The apparatus of claim 1, wherein the first transistor emitter is coupled to the second transistor base, and the first transistor base is coupled to the second transistor emitter.

4. The apparatus of claim 1, wherein the first attenuation network comprises:
    a first transistor, adapted to receive the electrical signal, having a resistance ($Rce_1$) between its collector and emitter nodes;
    a first resistor coupled to the first transistor collector and base nodes;
    a second transistor, adapted to receive the electrical signal, having a resistance ($Rce_2$) between its collector and emitter nodes; and,
    a second resistor coupled to the second transistor collector and base nodes.

5. The apparatus of claim 1, wherein the first signal level relay circuit further comprises a second switch adapted to receive the electrical signal and to activate the second attenuation network in response to the level of the electrical signal crossing the second threshold.

6. The apparatus of claim 5, wherein the second switch comprises:
    a first transistor coupled to receive the acoustic signal and detect a voltage on a positive half of the acoustic signal; and,
    a second transistor coupled to receive the acoustic signal and detect a voltage on a negative half of the acoustic signal.

7. The apparatus of claim 6, wherein the first transistor collector is coupled to the second transistor base, and the first transistor base is coupled to the second transistor collector.

8. The apparatus of claim 1, wherein the second attenuation network comprises:
    a first transistor coupled to a first resistor and having a resistance ($Rce_1$) between its collector and emitter nodes; and,
    a second transistor coupled to a second resistor and having a resistance ($Rce_2$) between its collector and emitter nodes.

9. The apparatus of claim 1, wherein the signal level limiting apparatus is integrated within a telephone headset.

10. The apparatus of claim 1, wherein the signal level limiting apparatus is integrated in a headset adapter that is coupled to a telephone headset and a telephone.

11. A communications headset, comprising:
    a communications interface that connects the communications headset to a communications device;
    a signal level limiter, adapted to receive an electrical signal from the communications interface, that establishes a maximum threshold level that the electrical signal level may not cross by activating a plurality of attenuation devices;
    wherein the signal level limiter includes first and second attenuation networks, the first attenuation network comprising:
    a first transistor, adapted to receive the electrical signal, having a resistance ($Rce_1$) between its collector and emitter nodes;

a first resistor coupled to the first transistor collector and base nodes;

a second transistor, adapted to receive the electrical signal, having a resistance ($Rce_2$) between its collector and emitter nodes; and, a second resistor coupled to the second transistor collector and base nodes; and, a speaker, coupled to receive an attenuated acoustic signal, that converts the attenuated electrical signal to an audible signal.

12. The communications headset of claim 11, wherein the signal level limiter further comprises:

a signal level attenuation circuit, adapted to receive the electrical signal, that activates the first attenuation network to attenuate the electrical signal in response to the level of the electrical signal crossing a first threshold; and, a first signal level relay circuit, adapted to receive the electrical signal, that activates the second attenuation network to attenuate the electrical signal in response to the level of the electrical signal crossing a second threshold; and, means for reducing the signal level to zero after the signal level exceeds a third threshold greater than the first and second thresholds.

13. The communications headset of claim 11, further comprising a communications adapter coupled to the communications interface, wherein the signal level limiter is integrated within the communications adapter.

14. The communications headset of claim 11, wherein the second attenuation network comprises:

a first transistor, adapted to receive the electrical signal, having a resistance ($Rce_1$) between its collector and emitter nodes;

a first resistor coupled to the first transistor collector and base nodes;

a second transistor, coupled to receive the electrical signal, having a resistance ($Rce_2$) between its collector and emitter nodes; and, a second resistor coupled to the second transistor collector and base nodes.

* * * * *